United States Patent [19]

Gotoh et al.

[11] Patent Number: 5,711,590
[45] Date of Patent: Jan. 27, 1998

[54] HEADLIGHT HAVING VARIABLE LIGHT DISTRIBUTION

[75] Inventors: Shinichiro Gotoh, Wako; Toshiaki Aoki, Yokohama; Takashi Futami; Masahito Okamoto, both of Kawasaki, all of Japan

[73] Assignees: Honda Giken Kogyo Kabushiki Kaisha; Stanley Electric Co., Ltd., both of Tokyo, Japan

[21] Appl. No.: 577,300

[22] Filed: Dec. 22, 1995

[30] Foreign Application Priority Data

Dec. 29, 1994 [JP] Japan ............... 6-338822

[51] Int. Cl.$^6$ ........................ B60Q 1/12
[52] U.S. Cl. ............ 362/43; 362/283; 362/284; 362/297; 362/324; 362/346
[58] Field of Search ............... 362/40, 41, 43, 362/61, 282, 284, 322, 324, 297, 346, 37, 39, 283

[56] References Cited

U.S. PATENT DOCUMENTS 5,060,120  10/1991  Kobayashi et al. ............ 362/282
5,436,807  7/1995  Kobayashi ....................... 362/41
5,599,085  2/1997  Tabata et al. ................... 362/66

FOREIGN PATENT DOCUMENTS 809916  3/1937  France ........................... 362/284
359752  10/1931  United Kingdom ............ 362/282

*Primary Examiner*—Alan Cariaso
*Attorney, Agent, or Firm*—Weingarten, Schurgin, Gagnebin & Hayes LLP

[57] ABSTRACT

An improved headlight having variable light distribution is provided, where said headlight comprises a reflector divided into an upper movable light distribution reflector and a lower fixed light distribution reflector by a horizontal line located 10 to 30 mm above the optical axis of the light source and the reflector, of which said movable light distribution reflector is rotatable around a vertical rotary axis practically crossing the optical axis of the light source and said fixed light distribution reflector is designed to reflect 50 to 60% of the total quantity of light applied to the reflector. With such an arrangement, the swerving side of the automobile is satisfactorily illuminated by the movable light distribution reflector while a desired frontal light distribution pattern of the headlight is ensured by the fixed light distribution reflector because the two reflectors provide a substantially equal quantity of light.

7 Claims, 4 Drawing Sheets

HEADLIGHT HAVING VARIABLE LIGHT DISTRIBUTION

BACKGROUND OF THE INVENTION

1. Field of the Invention

This invention relates to a headlight of an automobile or some other vehicle and, more particularly, it relates to a headlight that can change its light distribution pattern to swerve and broaden its coverage along the moving direction of the vehicle whenever the vehicle is maneuvered to turn to either side through the use of the steering wheel of the vehicle.

2. Background Art

FIGS. 7 through 9 show conventional head lights of the type under consideration. The headlights 90 of FIG. 7 are interlocked with the steering wheel and turn as a whole to either side as the automobile is maneuvered. The headlight 80 of FIG. 8 comprises a main reflector 81 and an auxiliary reflector 82 and only the auxiliary reflector 82 is interlocked with the steering wheel of the automobile and turns to either side with the maneuvering motion of the latter. Independent auxiliary lamps 70 are arranged adjacent to the respective headlights 90 in FIG. 9 and interlocked with the steering wheel of the automobile in such a way that only the one on the pulling side of the automobile is turned on when the vehicle is maneuvered to turn either side through the use of the steering wheel.

With the arrangement of FIG. 7, since the entire light distribution pattern of the headlights is swerved as the automobile is maneuvered to turn to either side, the front view of the driver is entirely or partly blacked out to annoy the driver.

Since the auxiliary reflector 82 is housed in the main reflector 81 of the headlights of FIG. 8, it and its counterpart are subjected to restrictions particularly in terms of surface area so that they cannot provide a sufficient quantity of light in the swerving direction of the automobile necessary to ensure a required level of visibility of the driver.

Additionally, with the arrangement of FIG. 8, the profile of the cut lenses of the headlights 80 is designed by referring to the performance of the headlights 80 when the auxiliary reflectors 82 are in the unpivoted square position so that, once the auxiliary reflectors 82 are turned to either side, rays of light are made to pass the cut lenses along a direction different from the square reference direction to give rise to an undesired lighting performance.

What is more, because of the dimensional restrictions of the headlight of FIG. 8, a sufficient angle of rotation is not allowed to the auxiliary reflector 82 so that it cannot adapt itself to the requirement of providing a satisfactory light distribution pattern to the driver when the automobile is swerved at right or acute angles in a crossing zone.

Finally, with the arrangement of FIG. 9, each of the auxiliary reflectors 70 is required to provide a level of brightness substantially equal to that of the corresponding headlight in order to ensure a good sideways visibility to the driver, although, more often than not, such a requirement cannot be met for the auxiliary reflector without occupying an unproportionally large part of the automobile. At the same time, since the auxiliary reflectors 70 are rigidly secured, they cannot be adapted to high speed running along a curved course if they are designed to adapt themselves to swerving at right or acute angles at a crossing.

SUMMARY OF THE INVENTION

According to the invention, the above identified problems and other problems of conventional headlights are dissolved by providing a headlight having variable light distribution, said headlight comprising a reflector and means for detecting a swerving motion of the automobile from the rotated angle of the steering wheel and other data on the behavior of the automobile and regulating the lighting range from the obtained data, characterized in that said reflector is divided into upper and lower sections along a horizontal line located above the optical axis of the reflector, of which the lower section operates as a fixed light distribution reflector whereas the upper section operates as a movable light distribution reflector rotatable around a vertical rotary axis practically crossing the optical axis of the light source of the head light.

DETAILED DESCRIPTION OF THE PREFERRED EMBODIMENTS

Figure 1:
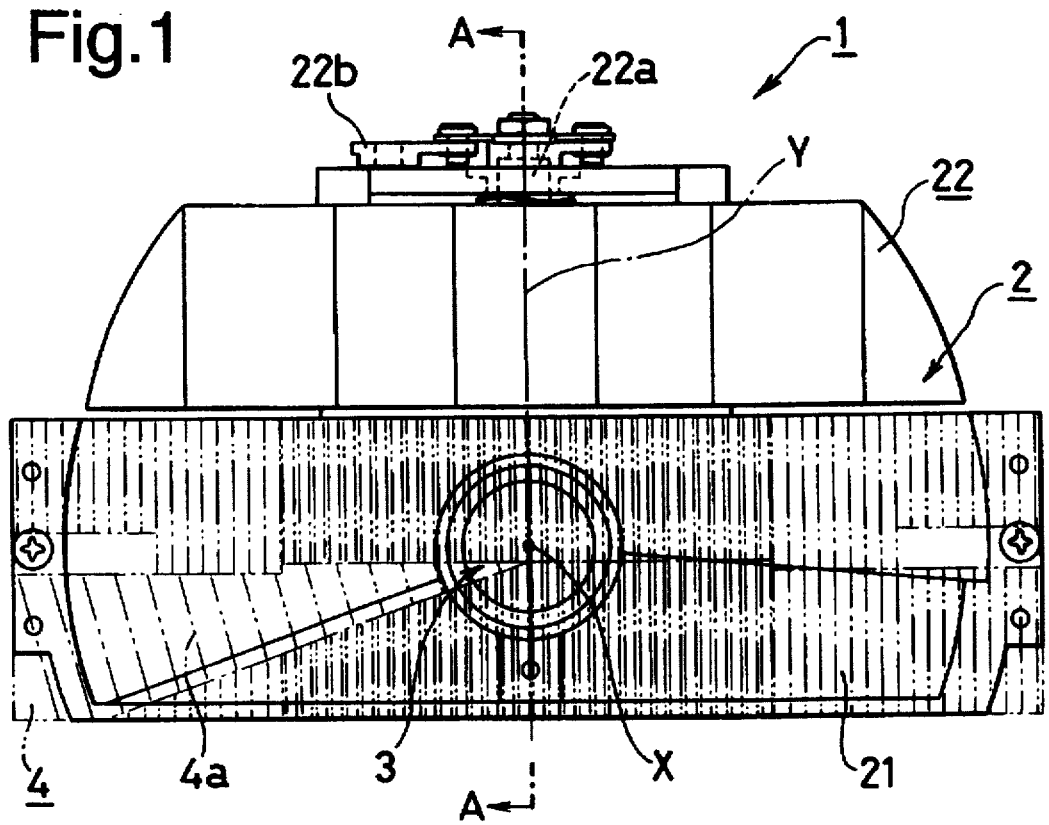
FIG. 1 is a schematic front view of part of an embodiment of headlight having variable light distribution according to the invention.
Figure 2:
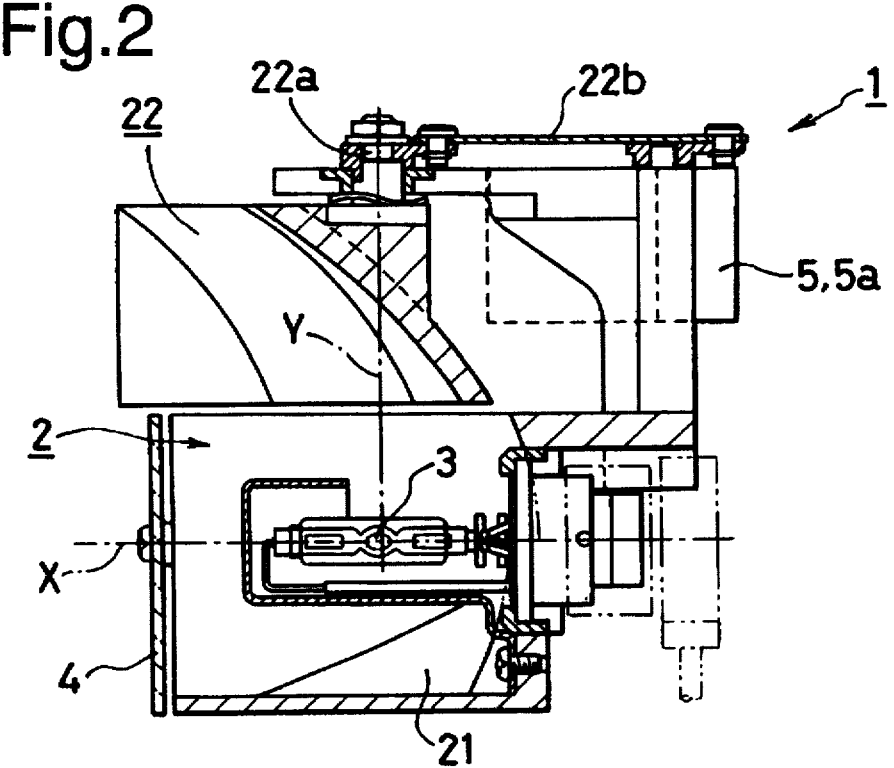
FIG. 2 is a schematic cross sectional view of the embodiment of FIG. 1 taken along line A—A.

Now, the present invention will be described by referring to the accompanying drawings that illustrate a preferred embodiment of the invention. Referring firstly to FIGS. 1 and 2, reference numeral 1 generally denotes a headlight having variable light distribution according to the invention comprising a reflector 2 which is divided into upper and lower sections by a horizontal line located 10 to 30 mm above the optical axis X of the reflector and the power source of the headlight, of which the lower section operates as a fixed light distribution reflector 21.

On the other hand, the upper section operates as a movable light distribution reflector 22 rotatable around a rotary axis 22a arranged along a vertical line Y practically crossing the optical axis of the light source 3 of the head light. The reflector 2 is so designed that the fixed light distribution reflector 22 covers 50 to 60% of the total quantity of light reflected by the reflector 2 as a whole and the horizontal line for dividing the reflector is selected to meet this requirement.

Of the fixed light distribution reflector 21 and the movable light distribution reflector 22, the former takes the role of providing a basic light distribution pattern of the headlight and preferably has a paraboloidal profile so that, when combined with a frontal cut lens 4 having a specific cutting pattern 4a, it may produce a desired light distribution pattern that may be asymmetrical and suited for an automobile keeping to the left.

The movable light distribution reflector 22, on the other hand, is designed to be that of a spot light for laterally narrow and slightly downward lighting. Since it is not required to produce an asymmetrical light distribution pattern, it may be used without a frontal lens to simplify its configuration and have a profile of a parabolic cylinder or a freely designed curved profile that can laterally diffuse rays of light from the light source 3.

The rotary axis 22a of the movable light distribution reflector 22 is provided a coupling mechanism 22b comprising a crank, gears and/or a belt and connected to a motor 5 that can accurately control the angle of revolution of the movable light distribution type reflector by means of a potentiometer 5a and drive the movable light distribution reflector 22 to rotate by a given angle of revolution.

Figure 3:
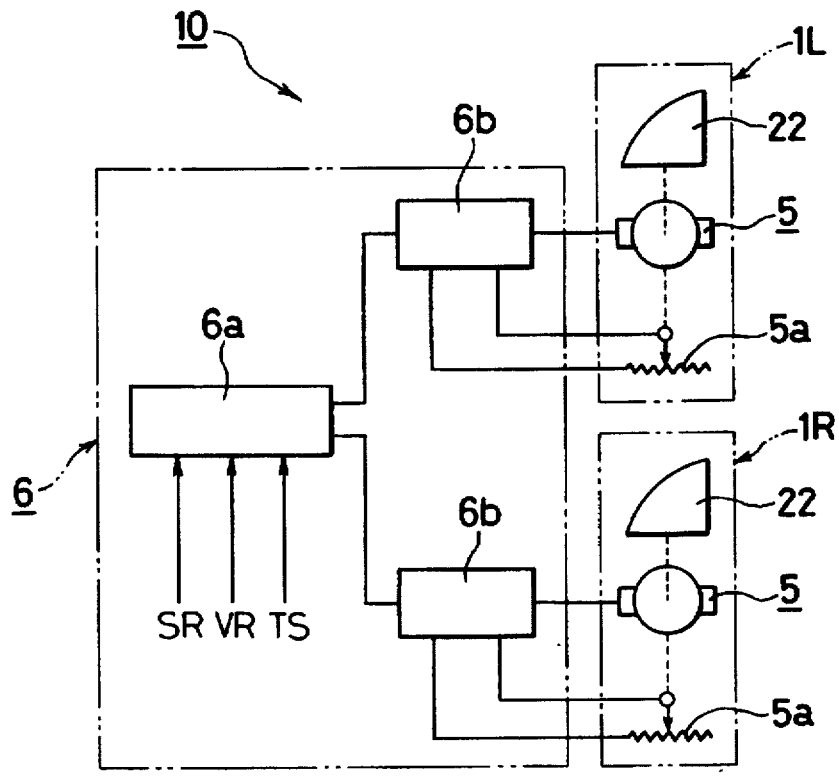
FIG. 3 is a circuit diagram of a drive circuit that can be used for the embodiment of FIG. 1.

FIG. 3 shows a circuit diagram of a drive circuit 6 that can be used for the motor 5 and comprises an arithmetic circuit 6a including a microcomputer 6a and a motor control circuit 6b. The arithmetic circuit 6a is designed to receive data such as a steering angle signal SR, a velocity signal VR and an indicator drive signal TS at a time and produce a signal representing a sense and an angle of revolution of the movable light distribution reflector 22a as a result of a series of arithmetic operations using the data.

Although the arithmetic circuit 6a is described in terms of a single headlight 1 above, it may be used to produce separate control signals respectively for the right and left headlights 1R and 1L.

Upon receiving the output signal from the arithmetic circuit 6a, the motor control circuit 6b causes the motor 5 to rotate by a given amount to drive the movable light distribution reflector 22 to revolve by a given angle or revolution. Under this condition, the output of the potentiometer 5a fitted to the motor 5 or the movable light distribution reflector 22 is fed back to the motor control circuit 6b to determine if the movable light distribution reflector 22 is rotated and directed to an right direction and, if not, the movable light distribution reflector 22 is operated for correction.

Figure 4:
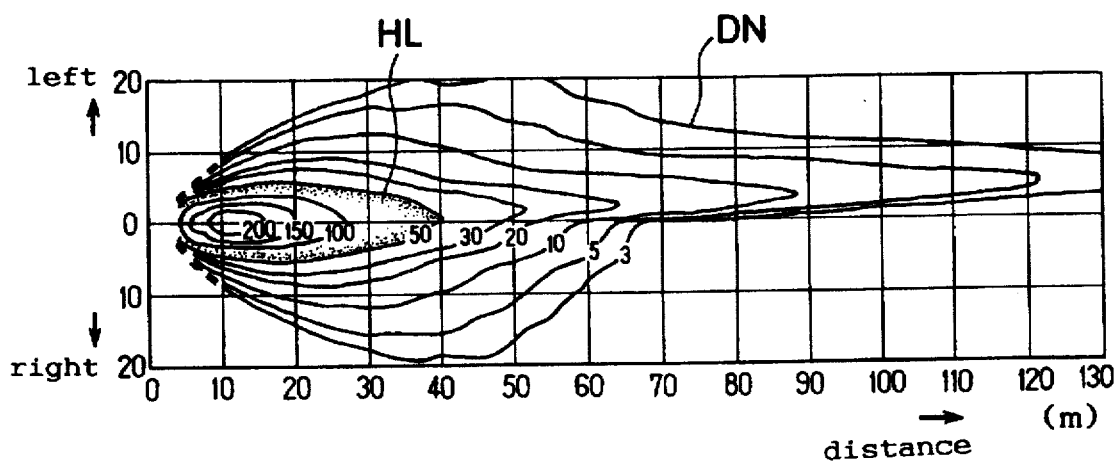
FIG. 4 is a graph showing the light distribution pattern of the embodiment of FIG. 1 obtained when an automobile provided with it is running straight ahead.

Now the operation and the effect of an arrangement 10 of a pair of headlights having variable light distribution according to the invention will be described. FIG. 4 is a graph showing the light distribution pattern DN of the arrangement 10 obtained when an automobile provided with a right headlight 1R and a left headlight 1L according to the invention is running straight ahead. As a matter of course, the movable light distribution reflectors of both the right and left headlights 1R and 1L are directed to the front of the automobile. Note that the right and left headlights 1R and 1L are designed for an automobile normally keeping to the left.

The above light distribution pattern DN for running straight ahead is not particularly different from that of a pair of headlights not provided with a movable light distribution arrangement according to the invention but designed by taking the beams of light emitted from a passing-by automobile into consideration. Note that the light distribution pattern DN is a combined effect of the fixed light distribution reflectors 21 designed to produce an asymmetric light distribution pattern by taking the beams of light emitted from a passing-by automobile into consideration and the movable light distribution reflectors 22 designed for symmetric downward lighting. Therefore, the high illumination intensity zone HL above 50 luxes of the light distribution pattern DN is located exactly in front of the automobile when the automobile is running straight ahead.

Figure 5:
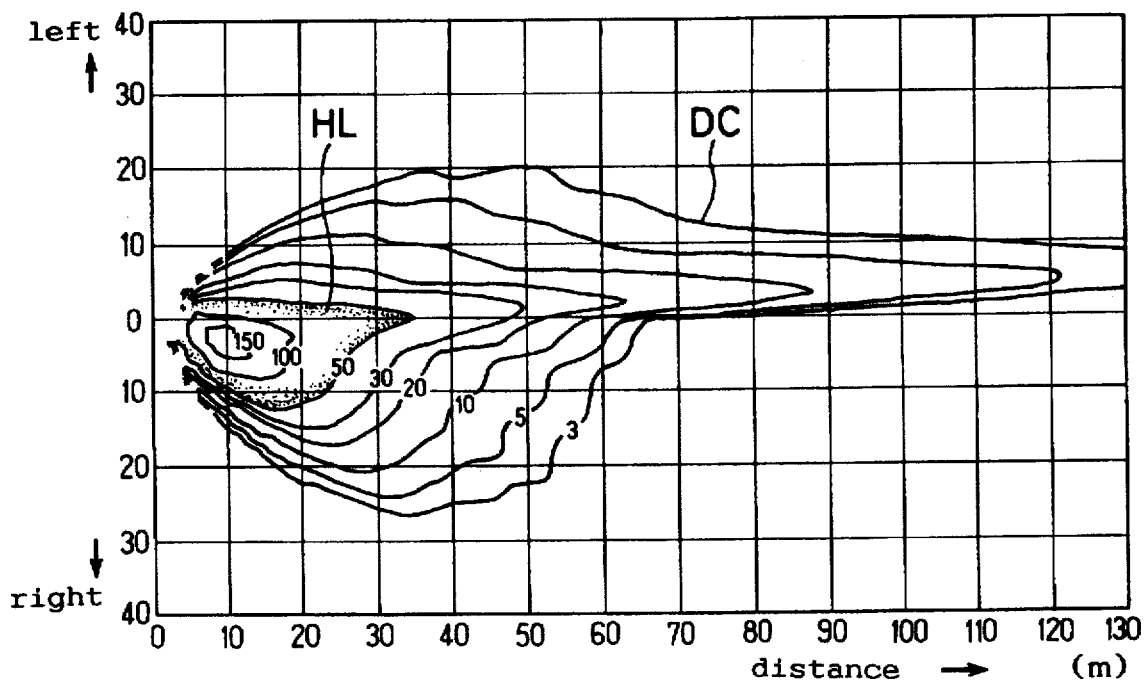
FIG. 5 is a graph showing the light distribution pattern of the embodiment of FIG. 1 obtained when an automobile provided with it is swerving.

FIG. 5 is a graph showing the light distribution pattern DC of the arrangement 10 obtained when an automobile provided with a right headlight 1R and a left headlight 1L according to the invention is swerving rightward. Under this condition, the arithmetic circuit 6a determines the sense (right or left) in and the amount (angle) with which the movable light distribution reflectors are rotated by arithmetic operations, using data such as such as a steering angle signal SR and a velocity signal VR (See FIG. 3.) at a time, and drives the movable light distribution reflectors 22 by means of the motor control circuit 6b accordingly.

As will be described hereinafter by referring to a crossing zone, the movable light distribution reflectors of headlights according to the invention can revolve rightward or leftward by an angle greater than 60° relative to the fixed light distribution reflectors. The graph shows a situation where the movable light distribution reflector of the rightside headlight 1R is rotated by 30° while that of the leftside headlight 1L is rotated by a half of it, or 15°.

It will be appreciated from FIG. 5 that, as the movable light distribution reflectors are turned rightward in accordance with the rightward swerving of the automobile, the right front of the automobile is illuminated brightly. Additionally, the basic light distribution pattern is provided by the fixed light distribution reflectors 21, taking the beams of light emitted from a passing-by automobile into consideration, and maintained under any conditions to light the square front of the automobile and ensure a good visibility for the driver.

Since both the fixed light distribution reflectors 21 and the movable light distribution reflectors 22 produce a substantially equal amount of light, the high illumination intensity zone HL of the light distribution pattern DC of a swerving automobile, which is a combined effect of the reflectors 21 and 22, is also moved toward the swerving side of the automobile to induce the driver's to turn to that side. Accordingly, the driver will be able to maneuver the automobile stably and smoothly as he or she gazes the right direction.

Figure 6:
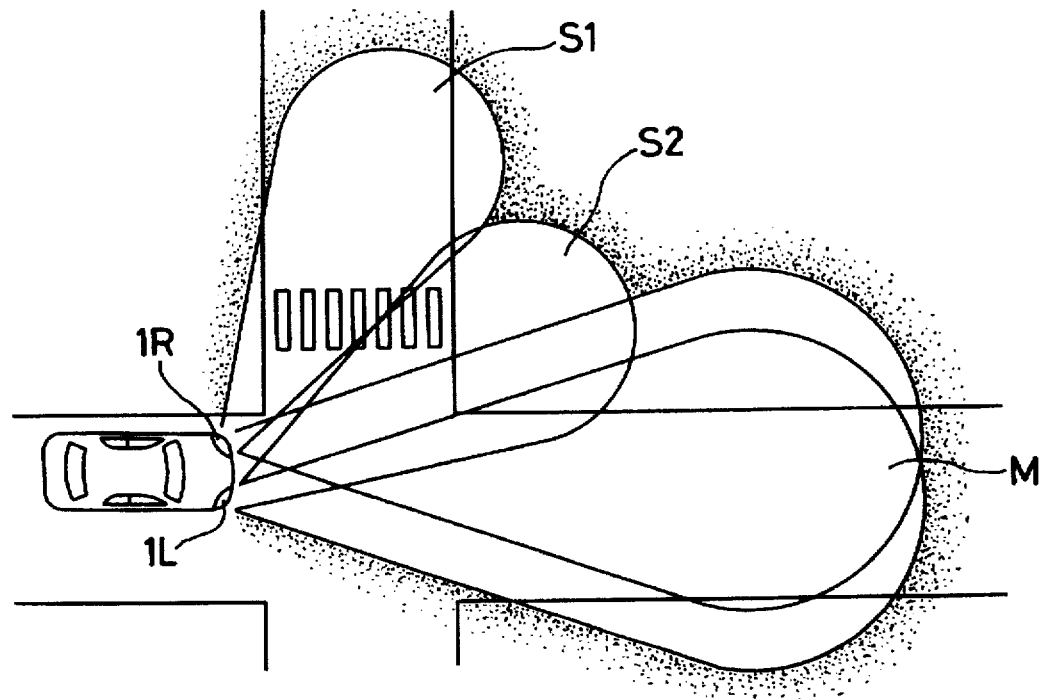
FIG. 6 is a schematic plan view of an automobile provided with a pair of headlights having variable light distribution according to the invention and passing through a crossing zone, showing its possible lighting patterns.
Figure 7:
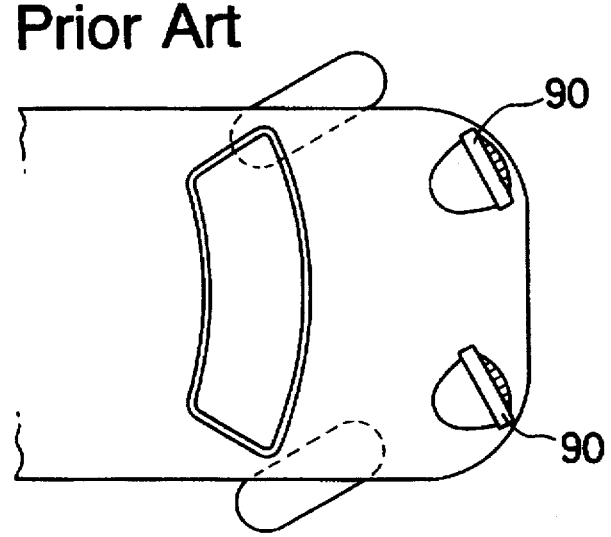
FIG. 7 is a schematic plan view of an automobile provided with a pair of conventional headlights having variable light distribution.
Figure 8:
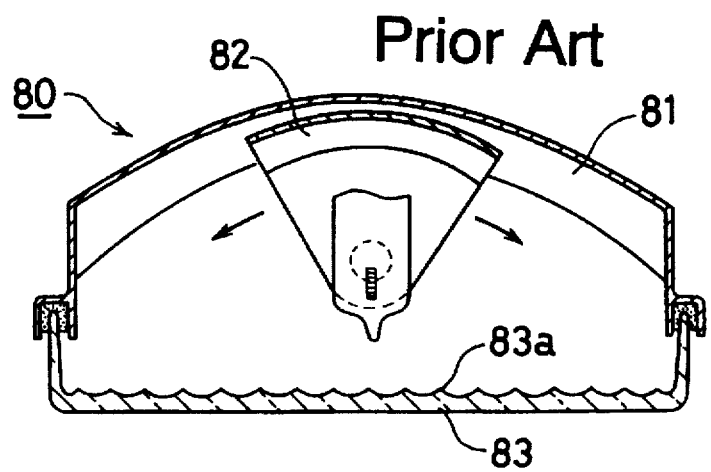
FIG. 8 is a schematic cross sectional plan view of another conventional headlight having variable light distribution.
Figure 9:
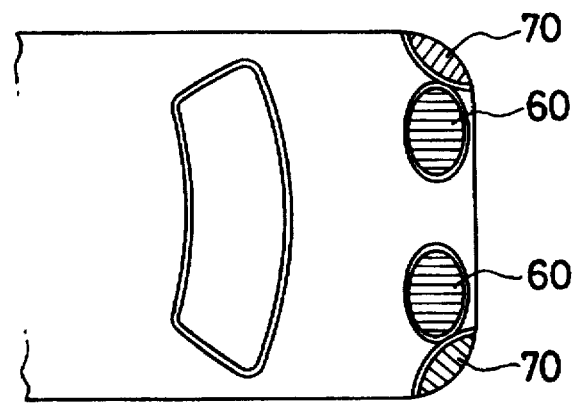
FIG. 9 is a schematic plan view of an automobile provided with still another pair of conventional headlights having variable light distribution.

FIG. 6 shows a schematic plan view of an automobile provided with a pair of headlights having variable light distribution according to the invention and passing through a crossing zone, showing its possible lighting patterns. If the driver turns on the left indicator lamp to turn left, the arithmetic circuit 6a receives an indicator drive signal TS. If the arithmetic circuit 6a also receives a low velocity signal VR (e.g., for less than 20 Km/hr) under this condition, it drives the left light distribution reflector 22 to turn leftward by the maximum angle of 60° regardless of the presence or absence of a steering angle signal SR.

If the left light distribution reflector 22 is designed to turn to its maximum possible angle to produce a principal auxiliary light distribution pattern S1 while the right light source light distribution reflector 22 is designed to turn to a half of its maximum possible angle to produce, at the same time, an inserting auxiliary light distribution pattern S2, then the latter can fill the lighting gap between the principal auxiliary light distribution pattern S1 and the main light distribution pattern M produced by the fixed light distribution reflectors to provide an overall lighting coverage that ensures a good visibility to the driver.

Since an indicator drive signal TS is supplied to the arithmetic circuit 6a when the automobile changes its lane, the arithmetic circuit 6a may be so designed that it reduces the angle of revolution of the related movable light distribution reflector as a function of the velocity of the automobile in order to make the driver feel comfortable when he or she is changing the lane on a highway.

As described above in detail, since the present invention provides a headlight having variable light distribution of an automobile comprising a reflector divided into a lower fixed light distribution reflector and an upper movable light distribution reflector by a horizontal line located above the optical axis of the light source of the headlight and the upper movable light distribution reflector is rotatable around a vertical rotary axis practically crossing the optical axis while the lower fixed light distribution reflector covers 50 to 60% of the total quantity of light reflected by the reflector 2 as a whole, the swerving side of the automobile is satisfactorily illuminated without damaging the frontal lighting effect of the fixed light distribution reflectors because the upper and lower light distribution reflectors provide a substantially equal quantity of light so that the driver can maneuver the automobile stably and smoothly as he or she is induced to gaze the right direction.

Additionally, since the movable light distribution reflector of a headlight according to the invention is realized to show a profile of a parabolic cylinder or a freely designed profile, the profile of the fixed light distribution reflector may be designed to produce a desired light distribution pattern, taking the beams of light emitted from a passing-by automobile into consideration, with an enhanced degree of design flexibility and in combination with a cut lens, whereas the movable light distribution reflector may be used without a lens. Still additionally, with a pair of headlights of an automobile according to the invention, the angles of revolution of the right and left movable light distribution reflectors may be differentiated so that the lighting gap between the light distribution pattern of the swerving side movable light distribution reflector and that of the fixed light distribution reflectors may be filled by that of the following side movable light distribution reflector to provide a satisfactory overall lighting coverage that ensures a good visibility to the driver. Finally, since an indicator drive signal is fed to an arithmetic circuit and used to supersede any other signals for controlling the movable light distribution reflectors whenever such a signal is detected, the headlights can quickly adapt themselves to a situation the automobile encounters in a crossing zone or when the automobile changes its lane.

What is claimed is:

1. A headlight having variable light distribution, said headlight comprising:

a reflector;

a light source having an optical axis; and means for detecting data indicative of
   a swerving motion of an automobile from a steering angle defined by the angle of rotation of a steering wheel;
   an indicator drive signal representing an intended change in direction; and
   the velocity of the automobile and for regulating an illumination pattern reflected from said reflector as a function of said detected data, wherein said reflector is divided into upper and lower sections along a horizontal line located above the optical axis of the light source, of which the lower section operates as a fixed light distribution reflector and of which the upper section operates as a movable light distribution reflector rotatable around a vertical rotary axis substantially intersecting the optical axis of said light source.

2. A headlight having variable light distribution according to claim 1, characterized in that said fixed light distribution reflector has a paraboloidal profile and said movable light distribution reflector has a profile of a parabolic cylinder or a freely designed curved profile.

3. A headlight having variable light distribution according to claim 1 characterized in that said headlight is one of a pair of headlights of an automobile, said automobile having a swerving side closest to an intended path of travel, and having an opposite following side, each side having a respective headlight wherein the movable light distribution reflector of the swerving side headlight is rotated outward with respect to said automobile by an angle determined as a function of the steering angle of the automobile wherein the movable light distribution reflector of the following side headlight is rotated inward with respect to said automobile by an angle smaller than the angle of rotation of the swerving side movable light distribution reflector.

4. A headlight having variable light distribution according to claim 1, said headlight further comprising a control device in communication with said means for detecting and responsive to said indicator drive signal for rotating the movable light distribution reflector to a side of the automobile corresponding to said indicator drive signal whenever said indicator drive signal is detected by said control device.

5. A headlight having variable light distribution according to claim 2 characterized in that said headlight is one of a pair of headlights of an automobile, said automobile having a swerving side closest to an intended path of travel, and having an opposite following side, each side having a respective headlight wherein the movable light distribution reflector of the swerving side headlight is rotated outward with respect to said automobile by an angle determined as a function of the steering angle of the automobile wherein the movable light distribution reflector of the following side headlight is rotated inward with respect to said automobile by an angle smaller than the angle of rotation of the swerving side movable light distribution reflector.

6. A headlight having variable light distribution according to claim 2, said headlight further comprising a control device in communication with said means for detecting and responsive to said indicator drive signal for rotating the movable light distribution reflector to a side of the automobile corresponding to said indicator drive signal whenever said indicator drive signal is detected by said control device.

7. A headlight having variable light distribution according to claim 3, said headlight further comprising a control device in communication with said means for detecting and responsive to said indicator drive signal for rotating the movable light distribution reflector to a side of the automobile corresponding to said indicator drive signal whenever said indicator drive signal is detected by said control device.

* * * * *